United States Patent
Schmidt et al.

(10) Patent No.: US 7,253,609 B2
(45) Date of Patent: Aug. 7, 2007

(54) ENCAPSULATED MEASURING APPARATUS FOR DETECTING A VELOCITY AND/OR ACCELERATION OF A ROTATIONALLY OR LINEARLY MOVED COMPONENT

(75) Inventors: Ralph Schmidt, Sondermoning (DE); Giselher Schneider, Traunstein (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 38 days.

(21) Appl. No.: 10/492,219

(22) PCT Filed: Sep. 25, 2002

(86) PCT No.: PCT/EP02/10714

§ 371 (c)(1),
(2), (4) Date: Oct. 26, 2004

(87) PCT Pub. No.: WO03/031993

PCT Pub. Date: Apr. 17, 2003

(65) Prior Publication Data

US 2005/0046413 A1    Mar. 3, 2005

(30) Foreign Application Priority Data

Oct. 8, 2001 (DE) .................. 101 50 935
Sep. 18, 2002 (DE) .................. 102 43 177

(51) Int. Cl.
  *G01P 15/08* (2006.01)
  *G01P 3/42* (2006.01)
(52) U.S. Cl. ............... 324/164; 324/162; 73/514.31
(58) Field of Classification Search ........ 324/162–166, 324/173, 174, 207.14–207.25; 73/514.31
See application file for complete search history.

(56) References Cited

U.S. PATENT DOCUMENTS

| 2,460,115 | A | 1/1949 | Adamson |
| 6,462,535 | B1 * | 10/2002 | Schwabe ................. 324/164 |
| 6,628,004 | B1 | 9/2003 | Boehringer et al. |
| 6,661,126 | B2 * | 12/2003 | Rudy ....................... 310/12 |
| 6,736,009 | B1 | 5/2004 | Schwabe |
| 6,848,308 | B2 * | 2/2005 | Bauer et al. ............. 73/514.31 |

FOREIGN PATENT DOCUMENTS

| DE | 26 02 619 A1 | 7/1977 |
| DE | 44 39 233 A1 | 7/1995 |
| DE | 198 51 003 A1 | 5/2000 |
| DE | 199 47 277 A1 | 4/2001 |
| EP | 0 661 543 A1 | 7/1995 |

OTHER PUBLICATIONS

Author unknown, "Input/Output Devices," 903 Machine Design, Ref. vol. : Basics of Design Engineering vol. 65, No. 13, Jun. 1993, pp. 383-384, 386-388, 390-392, 397-398, 415-418, 420, 422-426, 428-434.
Ernst, "Längenmessung," Digitale Längen- und Winkel-Messtechnik, published by Dr. Johannes Heidenhain GmbH of Traunreut, Germany, 1998, pp. 48-54.
Ernst, Digital Linear and Angular Metrology, published by Dr. Johannes Heidenhain GmbH of Traunreut, Germany, 1998, pp. 46-55.
Ernst, Digitale Längen- und Winkelmesstechnik, published by Dr. Johannes Heidenhain GmbH of Traunreut, Germany, 2001, pp. 48-55.

* cited by examiner

*Primary Examiner*—Jay M. Patidar
(74) *Attorney, Agent, or Firm*—Brinks Hofer Gilson & Lione

(57) ABSTRACT

An encapsulated measuring device for detecting a velocity and/or acceleration of a rotationally or linearly moved component. The device includes a measuring device housing having a wall, and a scanning unit arranged in the housing, the scanning unit including a scanning head in the form of a Ferraris sensor, and wherein an eddy current body of the Ferraris sensor includes at least a portion of the wall of the measuring device housing.

13 Claims, 4 Drawing Sheets

ENCAPSULATED MEASURING APPARATUS FOR DETECTING A VELOCITY AND/OR ACCELERATION OF A ROTATIONALLY OR LINEARLY MOVED COMPONENT

Applicants claim, under 35 U.S.C. §§ 120 and 365, the benefit of priority of the filing date of Sep. 25, 2002 of a Patent Cooperation Treaty patent application, copy attached, Serial Number PCT/EP02/10714, filed on the aforementioned date, the entire contents of which are incorporated herein by reference, wherein Patent Cooperation Treaty patent application Serial Number PCT/EP02/10714 was not published under PCT Article 21(2) in English.

Applicants claim, under 35 U.S.C. § 119, the benefit of priority of both 1) the filing date of Oct. 8, 2001 of a German patent application, copy attached, Serial Number 101 50 935.9, filed on the aforementioned date and 2) the filing date of Sep. 18, 2002 of a German patent application, copy attached, Serial Number 102 43 177.9, filed on the aforementioned date, the entire contents of each of which are incorporated herein by reference.

BACKGROUND OF THE INVENTION

1. Field of the Invention

The present invention relates to an encapsulated measuring device for detecting the velocity and/or acceleration of a rotationally or linearly moved component, in particular for detecting the position and acceleration (velocity) of a rotationally or linearly moved component.

2. Description of the Related Art

Encapsulated photoelectrical linear measuring devices are known from the publication "Digitale Längen-und Winkelmess-technik: Positionsmesssysteme für den Maschinenbau und die Elektronikindustrie" [Digital Linear and Angular Measurement Technology: Position Measuring Systems for Mechanical Engineering and the Electronic Industry] (Moderne Industrie, publ., 4th ed., 2001), pages 48 to 54, which includes of a glass scale and a scanning head, which has a semiconductor light source, a condenser lens, a scanning plate and photo diodes and is arranged on a scanning carriage, which is supported by ball bearings on the glass scale. The scale and the scanning head are arranged protected in an aluminum housing, which has a slit, open at the bottom and closed by elastic sealing lips, so that no foreign objects can penetrate the interior of the aluminum housing. The housing is fastened, for example, on the machine bed of a machine tool, and the tool carriage is connected to a mounting foot, which extends through the sealing lips into the interior of the aluminum housing with an arm in the shape of a sword and takes along the scanning carriage free of play.

Encapsulated angle measuring devices with a photoelectrically scanned graduation on a glass plate, which is fastened on a shaft, are known from the same publication. The graduation and the optical system for scanning the graduation are protected against foreign objects by a sealed housing.

Both systems are used for the highly accurate detection of the position, or angular position, of linearly or rotationally moved components, even under difficult employment conditions.

In connection with the establishment of a high-quality position or velocity control of a rotory or linear electrical drive mechanism it is known from DE 198 51 003 A1 to regulate the acceleration of a moved component directly in an underlayed manner instead of by secondary current regulation. Although it is possible in principle to form the acceleration of a moved component by double differentiation of a detected position signal, a directly measured acceleration is preferred, since with double differentiation of the position signal small detection errors in the position signal are amplified, so that this method is prone to errors. However, it is possible by a directly measured acceleration to produce an optimal regulation structure, wherein a Ferraris sensor is employed as the direct acceleration measuring device which, with rotory drive mechanisms, detects the rotary acceleration of a rotor and, with linear drive mechanisms, the linear acceleration of a rotor.

An analog sensor operating in accordance with the Ferraris principle is known from DE 44 39 233 A1 for detecting the rotary acceleration of a rotationally moved component, which has a rotary body in the form of a disk or of a hollow cylinder made of an electrically conductive non-ferromagnetic material, through one half of which a stationary d.c. magnetic field extends in one direction, and through the other half of which it extends in the other direction. The analog sensor furthermore has a signal detection system with at least one magnetic flux sensor, through which the magnetic flux linked with the eddy currents flowing in the rotary body extends and which has a coil, in which a change of the magnetic flux creates an electrical voltage.

While for detecting the acceleration of a rotationally moved body by an acceleration sensor operating in accordance with the Ferraris system a rotating body is employed as the eddy current body, a Ferraris sensor including a flat eddy current sheet metal plate made of an electrically conductive material and having one scanning head arranged on one side of the eddy current sheet metal plate, or two scanning heads arranged on both sides of the eddy current sheet metal plate, is employed for detecting the acceleration of a linearly moved body. Thus, an eddy current body in the form of a rotating body or eddy current sheet metal plate is required for detecting the acceleration of a rotationally moved component, as well as for detecting the acceleration of a linearly moved component by an acceleration sensor operating in accordance with the Ferraris principle.

However, problems in connection with the arrangement of the various scanning units within the spatially restricted measuring device housing occur in particular with an encapsulated measuring device for detecting the position or angular position of a linearly or rotationally moved component, wherein it is additionally necessary to take into consideration that ball bearing-supported guide elements and couplings must be provided between the scanning carriage connected with the moved component and the measuring device housing, or the fixed scale.

A further problem lies in that with an acceleration sensor operating in accordance with the Ferraris principle it is necessary to arrange the eddy current body at only a slight distance from the scanning head, so that great demands are made on the manufacturing accuracy in connection with measuring devices for linearly moved components, as well as measuring devices for rotationally moved components.

SUMMARY AND OBJECTS OF THE INVENTION

It is an object of the present invention to disclose an encapsulated measuring device of the species mentioned at the outset which makes possible an extremely accurate manufacture without an additional outlay, is distinguished by minimal space requirements inside the encapsulated measuring device housing and can be optimally combined with a position or angular position measuring system.

In accordance with the present invention, this object is attained by an encapsulated measuring device for detecting a velocity and/or acceleration of a rotationally or linearly moved component. The device includes a measuring device housing having a wall, and a scanning unit arranged in the housing, the scanning unit including a scanning head in the form of a Ferraris sensor, and wherein an eddy current body of the Ferraris sensor includes at least a portion of the wall of the measuring device housing.

The attainment of the object in accordance with the present invention makes an encapsulated measuring device available, which allows a highly precise integration of an accelerator sensor operating in accordance with the Ferraris principle without an additional outlay, requires little space for the scanning units to be arranged in the measuring device housing, and is particularly suitable for the combination of a linear or rotary position or angular position measuring device with a directly measuring acceleration sensor for a linearly or rotationally moved component.

Because of the employment of a Ferraris sensor with a scanning head arranged on one side of an eddy current body, and because of using one wall of the measuring device housing as the eddy current body, so that the eddy current body is an integral component of the housing, not only is the additional arrangement of an eddy current body in the measuring device housing avoided, but it is also possible to use the highly precise manufacture of the measuring device housing necessary for the guidance of the scanning carriage, and the maintenance of a constant minimum distance between the housing wall and the scanning carriage, for the precise manufacture of the scanning unit operating in accordance with the Ferraris principle.

In a preferred embodiment the scanning head has at least one magnet for generating an exterior magnetic field approximately perpendicular with respect to the surface of the wall of the measuring device housing constituting the eddy current body of the Ferraris sensor, and at least one detector coil with an axis for detecting the changes in an interior magnetic field caused by eddy currents generated by changes in the acceleration of the rotationally or linearly moved component, wherein the axes of the detector coils extend approximately perpendicularly with respect to the surface of the wall of the measuring device housing constituting the eddy current body of the Ferraris sensor, and the magnets and detector coils are alternatingly arranged next to each other in a direction of the acceleration to be measured. The magnets and detector coils can moreover be arranged on a ferromagnetic support structure.

The scanning unit preferably only has a single scanning head arranged on a wall of the measuring device housing used as the eddy current body, so that minimal space is required inside the measuring device housing.

For the purpose of an optimal detection of the acceleration of the moved component by the employment of the Ferraris effect, the measuring device housing includes an electrically conducting and ferromagnetically non-conducting material, in particular aluminum, copper or an aluminum or a copper alloy, so that the wall of the measuring device housing used as the eddy current body causes optimal sensor signals.

A preferred embodiment of the attainment of the object in accordance with the present invention is provided by an encapsulated measuring device for detecting the position and acceleration (velocity) of a rotationally or linearly moved component wherein, besides the components of the scanning unit embodied as a Ferraris sensor for detecting the velocity and/or acceleration of the rotationally or linearly moved component, a position measuring system is arranged in the measuring device housing, and parts of the position measuring system are connected with the measuring device housing.

The combination of the position and acceleration measuring device provides a large synergy effect, wherein the measuring device housing is used for the protection of the position and acceleration measuring system, as well as for receiving parts of the position measuring system and for forming the eddy current body of the scanning unit operating in accordance with the Ferraris principle.

This synergy effect, as well as the space-saving, highly precise arrangement of the components of the position and acceleration device, are preferably suitable for a photoelectrical linear measuring device as the position measuring system, consisting of a glass scale connected with the measuring device housing and a photoelectrical scanning head, which is arranged on a scanning carriage supported on the glass scale.

In connection with a measuring device encapsulated in this way, the scanning head of the Ferraris sensor is preferably integrated into the scanning carriage of the linear measuring device.

An advantageous further development of a combined photoelectric linear measuring device having a directly measuring acceleration sensor which operates in accordance with the Ferraris principle includes that the position measuring system includes an incident light system or a transmitted light system arranged between a first side of the measuring device housing and the scanning carriage, that the scanning carriage has a sword-shaped arm, which extends through elastic sealing lips closing a gap in the measuring device housing and is connected with a mounting foot arranged outside the measuring device housing and is connected with the linearly moved component, and that the scanning head of the Ferraris sensor is arranged at a second location on the scanning carriage. In this case the photoelectric scanning head is arranged on a side of the scanning carriage located opposite the sword-shaped arm, and the scanning head of the Ferraris sensor is arranged on a side of the scanning carriage oriented toward a lateral wall of the measuring device housing.

The concept on which the present invention is based will be explained in greater detail by means of an exemplary embodiment represented in the drawings. Shown are in:

DESCRIPTION OF THE PREFERRED EMBODIMENT(S) OF THE INVENTION

Figure 1:
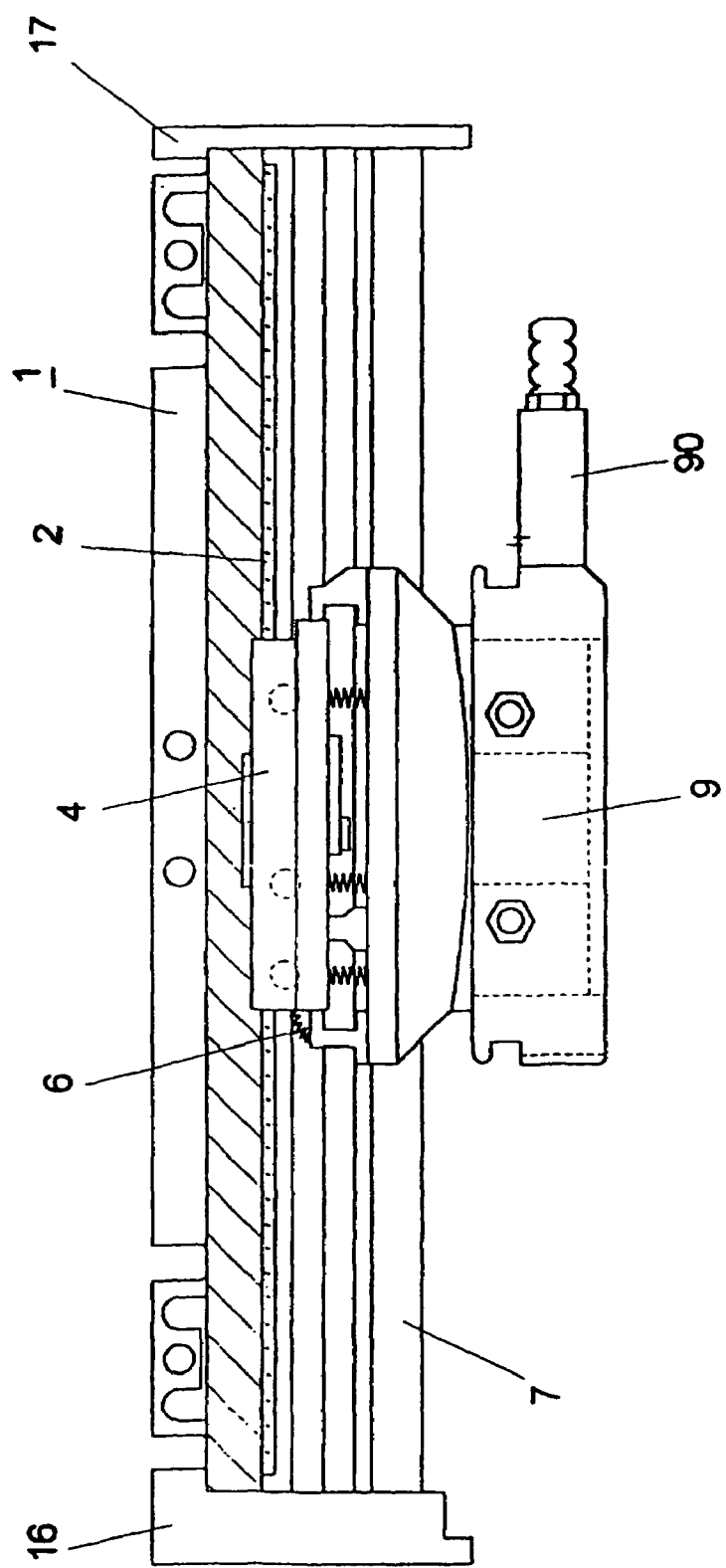
FIG. 1 schematically shows an embodiment of a structure of an encapsulated linear measuring device in accordance with the present invention.
Figure 2A:
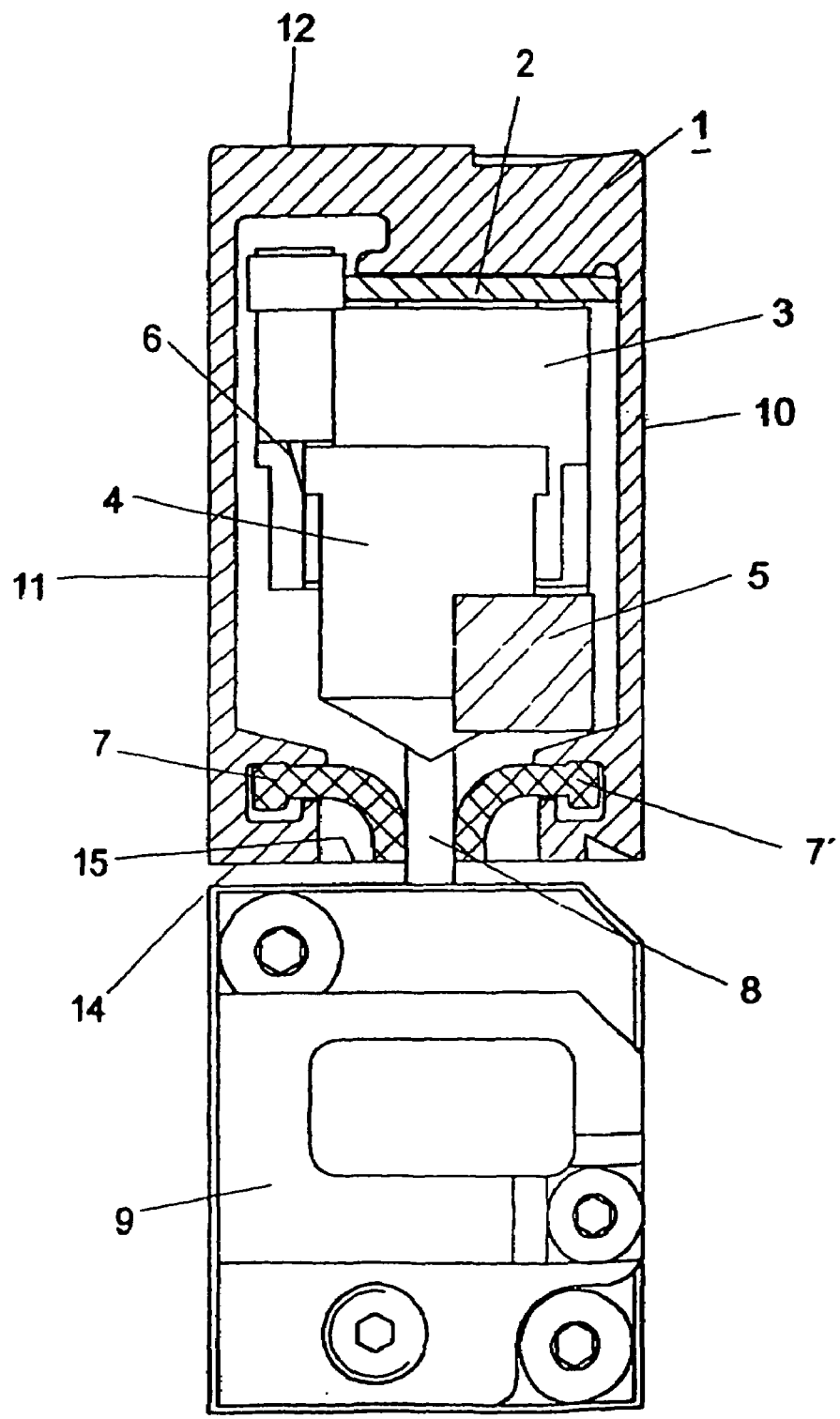
FIG. 2a shows a section through the encapsulated linear measuring device in accordance with FIG. 1 with the integrated scanning head of a Ferraris sensor in a first embodiment.

The measuring device schematically represented in FIGS. 1 and 2a, b is used for linear or position measuring, as well as for detecting the velocity, or acceleration, of a linearly moved component, for example for measuring the carriage displacement in a machine tool. The measuring device has a measuring device housing 1, whose ends are covered by end covers 16, 17 and which is composed of a top 12, two lateral walls 10, 11 extending parallel with respect to each other, and a bottom 14, which has a gap 15 closed off by sealing lips 7, 7'. A scale 2 is arranged in the measuring device housing 1 and is connected with the top 12 of the measuring device housing 1.

A scanning carriage 4, supported by ball bearings on the scale 2, has an opto-electronic scanning head 3, whose design is a function of the type of photoelectric measuring principle respectively employed. Besides imaging measuring methods or projection methods, which can be operated as transmitted or incident light methods, interferential measuring methods are also employed.

When employed in connection with an incident light method, the scanning head 3 includes a semiconductor light source, a condenser lens, a scanning plate and photo diodes, by which a graduation located on a scale is scanned and from this the length of travel of the linearly moved component, or its position, is determined. The scanning carriage 5 is connected via a sword-shaped arm 8 extending through the sealing lips 7, 7' with a mounting foot 9, which is arranged outside the measuring device housing 1, and is connected, free of play, with the scanning carriage 5, and on which an adapter cable 90 is fastened, which is connected with an electronic evaluating or sequence device. A precision coupling 6 between the scanning carriage 4 and the arm 8 in a sword-shape is used for compensating assembly tolerances, since the measuring device 1 is connected with the machine bed, for example, while the mounting foot 9, which is connected via the sword-shaped arm 8 with the scanning carriage 4, is fastened on a tool carriage.

The glass scale 2 is elastically fastened in the measuring device housing 1, so that the greater thermal expansion of the material of the measuring device housing 1, which is made of an electrically conducting, but preferably ferromagnetically non-conducting material, such as aluminum or copper or an aluminum or a copper alloy, does not affect the accuracy of the scale.

In accordance with the present invention, a Ferraris sensor, which is composed of a scanning head and an eddy current body, is provided for detecting, in particular, the acceleration of a linearly moved component. The scanning head 5 of the Ferraris sensor 4 is integrated into the scanning carriage 4 and, in accordance with FIGS. 3 and 4, includes magnets and detector coils, which are alternatingly arranged in the linear direction and are arranged on a ferromagnetic support structure.

Figure 2B:
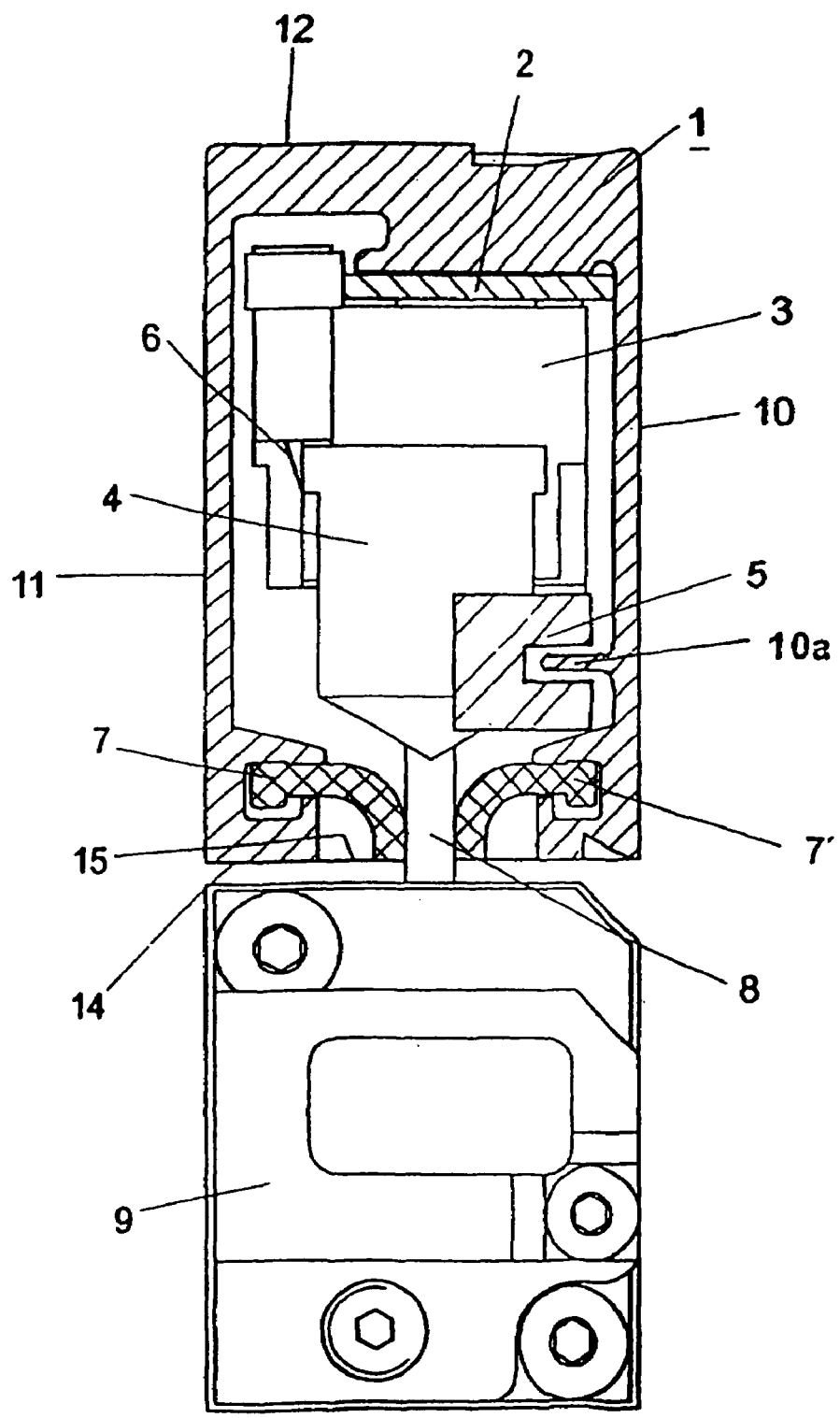
FIG. 2b shows a section through the encapsulated linear measuring device in accordance with FIG. 1 with the integrated scanning head of a Ferraris sensor in a second embodiment.

In accordance with the present invention, the eddy current body of the Ferraris sensor is constituted by the lateral wall 10 of the measuring device housing 1 which is located opposite the scanning head 5, so that no additional arrangement of a plate-shaped eddy current body, which is separate from the measuring device housing 1, is necessary. In accordance with FIG. 2a, eddy currents in the lateral wall 10 are detected on one side by the scanning head 5. For reducing the sensitivity of the arrangement to spacing fluctuations between the lateral wall 10 and the scanning head 5 it is also possible in accordance with FIG. 2b to provide a rib 10a formed in one piece on the lateral wall 10. It can be scanned on both sides by a suitable scanning head 5, so that a greater distance on one side of the rib 10a is compensated by a lesser distance on the other side of the rib 10a. Forming the rib 10a requires only a slight additional outlay if it is an extruded section, for example. Since the measuring device housing also includes an electrically conducting, but preferably ferromagnetically non-conducting material, such as aluminum or copper, the eddy current body of the Ferraris sensor has ideal properties for achieving optimal signal strengths. Moreover, the precision of the measuring device housing 1 required for the linear movement of the scanning carriage 4 is used for maintaining a constant gap between the scanning head 5 of the Ferraris sensor and the eddy current body 10, so that a minimal gap required for optimal signal detection is provided.

Figure 3:
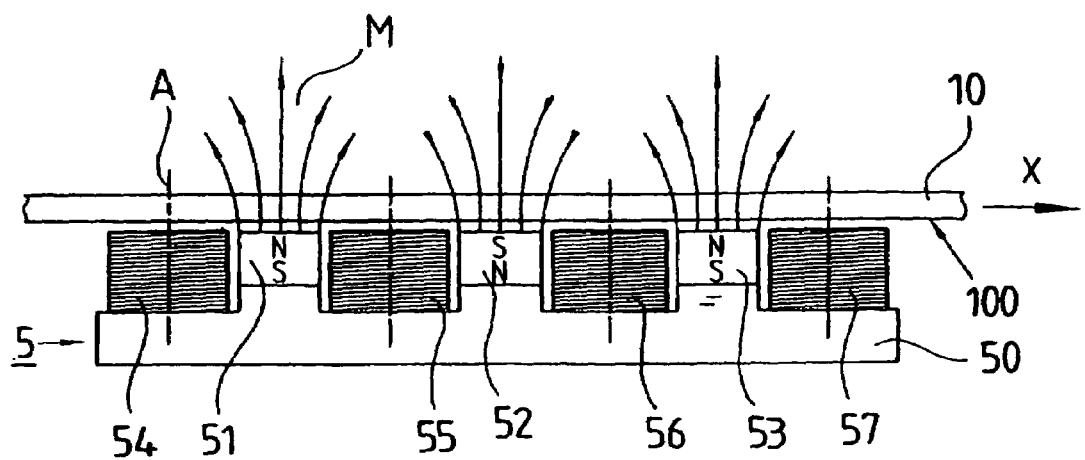
FIG. 3 shows a lateral view of an embodiment of a scanning head of a Ferraris sensor in accordance with the present invention.
Figure 4:
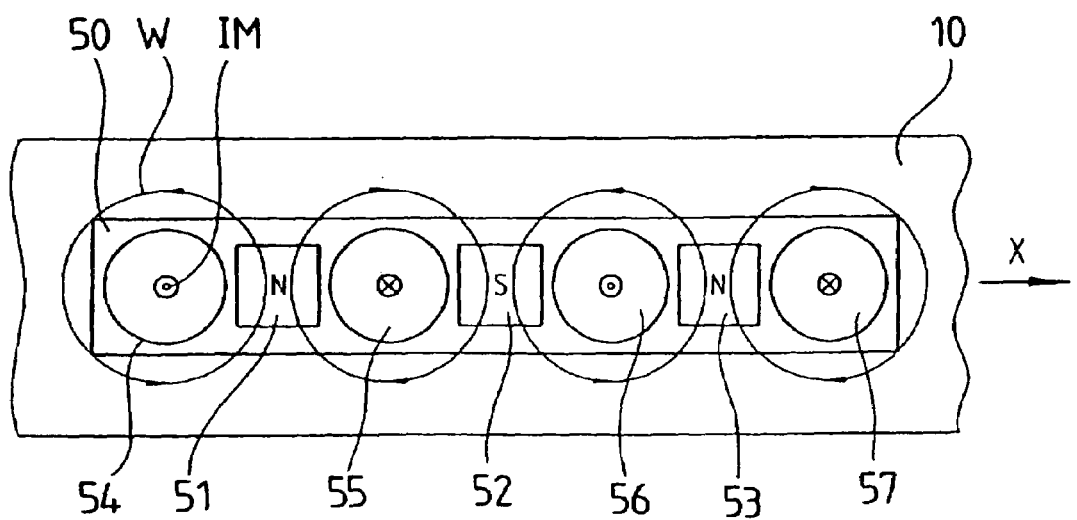
FIG. 4 shows a view from above on the scanning head in FIG. 3.

The structure and function of the Ferraris sensor for detecting the velocity or acceleration of a linearly moved component will be described in greater detail in what follows by FIGS. 3 and 4, wherein FIG. 3 shows a lateral view of a Ferraris sensor for measuring accelerations of a linearly moved component, and FIG. 4 shows a view of the Ferraris sensor from above in accordance with FIG. 3.

The scanning head 5 of the Ferraris sensor located opposite the lateral wall 10 of the measuring device housing 1 has three magnets 51, 52, 53, which are arranged in alternating magnetic orientation along the acceleration in the direction X to be detected. Since the distance between the magnets 51, 52, 53 and the eddy current body 10 is kept as short as possible, the exterior magnetic field M extends almost perpendicularly through the surface of the lateral wall 10. Four detector coils 54, 55, 56, 57, whose coil axes A also extend perpendicularly with respect to the surface of the lateral wall 10, are arranged next to, or between the magnets 51, 52, 53. Thus, magnets 51, 52, 53 and detector coils 54, 55, 56, 57 are alternatingly arranged in the movement direction X of the acceleration to be measured, wherein the magnetic pole facing the lateral wall 10 changes from one magnet to the next magnet.

The magnets 51, 52, 53 and detector coils 54, 55, 56, 57 are arranged on a ferromagnetic support structure 50. It is possible to see in the view from above in FIG. 4 that eddy currents W are generated by the relative movement between the scanning head 5 and the lateral wall 10 being used as the eddy current body, which have been represented in a simplified manner in the form of circles. Thus, viewed in the direction of movement X, an eddy current W is created behind a north pole of one of the magnets 51, 52, 53, which replaces the exterior magnetic field M with an interior magnetic field IM of the same direction. To this end, in the view from above the eddy current W must circulate in a counterclockwise direction. This correspondingly applies to an area ahead of a north pole, or to the areas ahead of and behind a south pole of one of the magnets 51, 52, 63.

Ahead of the first, or behind the last magnet 51 or 53 a weaker eddy current W is created than between two magnets 51, 52 or 52, 53, since the local changes of the exterior magnetic field are only half as great. The directions of all exterior magnetic fields M and interior magnetic fields IM can be seen in FIGS. 3 and 4.

With a constant movement, the eddy currents W, and therefore the interior magnetic fields IM, are also constant, so that no voltage is induced in the detector coils 54, 55, 56, 57. An acceleration in the movement direction X of the linearly moved component connected with the scanning head 5 causes a change of the eddy currents W and therefore also of the interior magnetic fields IM. Since the interior magnetic field IM penetrates the detector coils 54, 55, 56, 57, voltages, which are proportional to the acceleration, are induced in the coils 54, 55, 56, 57. It is therefore possible to determine the acceleration of the linearly moved component by evaluating the voltages in an electronic follow-up device.

Based on the special arrangement represented in FIGS. 3 and 4, the detector coils 54, 55, 56, 57 detect the interior magnetic fields IM in a particularly effective manner, since their coil axes A are approximately congruent with the respective axes of rotation of the eddy current W. This is achieved by arranging the detector coils 54, 55, 56, 57 in a row with and respectively next to the magnets 51, 52, 53.

For scanning an eddy current structure in the form of a rib 10a formed as one piece on the lateral wall 10 in accordance with FIG. 2, two of the Ferraris sensors described in FIG. 3 and FIG. 4 can be employed in the scanning head 5, wherein the top and the underside of the rib are being scanned.

In place of the exemplary embodied represented by an encapsulated linear and acceleration measuring device for linearly moved components shown above, the present invention can also be applied in an analogous manner to an encapsulated angle and angular acceleration measuring device for rotationally moved components.

Further embodiment variations of the method in accordance with the present invention of course exist besides the explained example.

The invention claimed is:

1. An encapsulated measuring device for detecting a velocity and/or acceleration of a rotationally or linearly moved component, the device comprising:
    a measuring device housing comprising a wall, wherein said wall comprises a rib with two sides, wherein said rib is an extruded section of said measuring device housing;
    a scanning unit arranged in said measuring device housing, said scanning unit comprising a Ferraris sensor, wherein said Ferraris sensor comprises:
    a scanning head; and
    an eddy current body that comprises said rib, wherein said scanning head is positioned so as to scan said two sides of said rib and wherein an eddy current body of said Ferraris sensor comprises at least a portion of said wall of said measuring device housing.

2. The measuring device in accordance with claim 1, wherein said scanning head comprises:
    a magnet for generation of an exterior magnetic field approximately perpendicularly with respect to a surface of said wall; and
    a detector coil with an axis that extends approximately perpendicularly with respect to said surface of said wall, wherein an interior magnetic field is generated by eddy currents and said detector coil detects changes of said interior magnetic field that are caused by acceleration of rotationally or linearly moved components.

3. The measuring device in accordance with claim 2, further comprising a second magnet and a second detector coil, wherein said magnet and said second magnet are arranged next to and in alternation with said detector coil and said second detector coil in a direction of said acceleration to be measured.

4. The measuring device in accordance with claim 2, wherein said magnet and said detector coil are arranged on a ferromagnetic support structure.

5. The measuring device in accordance with claim 1, wherein said measuring device housing comprises an electrically conducting material.

6. The measuring device in accordance with claim 5, wherein said electrically conducting material is a magnetically non-conducting material.

7. The measuring device in accordance with claim 5, wherein said measuring device housing comprises a material selected from the group consisting of aluminum, copper, an aluminum alloy and a copper alloy.

8. The measuring device in accordance with claim 1, further comprising a position measuring device arranged in said measuring device housing and a portion of said position measuring device is connected with said measuring device housing.

9. The measuring device in accordance with claim 8, wherein said position measuring device is a photoelectric linear measuring device that comprises:
    a glass scale connected with said measuring device housing; and
    a photoelectric scanning head arranged on a scanning carriage supported on said glass scale.

10. The measuring device in accordance with claim 9, wherein said Ferraris sensor is integrated into said scanning carriage.

11. The measuring device in accordance with claim 10, wherein said position measuring device comprises an incident light or transmitted light system arranged between a first side of said measuring device housing and a first side of said scanning carriage.

12. The measuring device in accordance with claim 11, wherein said scanning carriage comprises a sword-shaped arm that extends between elastic sealing lips closing off said measuring device housing, and is connected with a mounting foot that is arranged outside said measuring device housing and is connected with a linearly moved component, and said Ferraris sensor is arranged on a second side of said scanning carriage.

13. The measuring device in accordance with claim 12, wherein said photoelectric scanning head is arranged on a side of said scanning carriage opposite said sword-shaped arm, and said Ferraris sensor arranged on a side of said scanning carriage oriented toward a lateral wall of said measuring device housing.

* * * * *